United States Patent
Jung et al.

(10) Patent No.: US 8,471,547 B2
(45) Date of Patent: Jun. 25, 2013

(54) CIRCUIT ARRANGEMENT AND METHOD FOR INDUCTIVE ENERGY TRANSFER

(75) Inventors: Philipp Jung, Griesheim (DE); Joachim Lepper, Usingen (DE); Jan Christian Langsdorf, Oberursel (DE); Lutz Ronald Herzberg, Frankfurt am Main (DE); Thomas Hohmann, Gelnhausen (DE); Herbert Petzold, Wiesbaden (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 13/315,320

(22) Filed: Dec. 9, 2011

(65) Prior Publication Data

US 2012/0105044 A1    May 3, 2012

Related U.S. Application Data

(63) Continuation of application No. PCT/EP2010/003461, filed on Jun. 9, 2010.

(51) Int. Cl.
*G05F 3/02*    (2006.01)

(52) U.S. Cl.
USPC ........................................................ 323/305

(58) Field of Classification Search
USPC .................. 323/304, 305, 355, 356; 307/104, 307/108
See application file for complete search history.

(56) References Cited

U.S. PATENT DOCUMENTS

| | | | |
|---|---|---|---|
| 3,355,650 A | 11/1967 | Tolmie | |
| 7,521,890 B2* | 4/2009 | Lee et al. | 320/108 |
| 8,054,651 B2* | 11/2011 | Pollard | 363/17 |
| 2007/0145830 A1* | 6/2007 | Lee et al. | 307/135 |
| 2011/0012432 A1* | 1/2011 | Jung et al. | 307/104 |
| 2012/0032632 A1* | 2/2012 | Soar | 320/108 |
| 2012/0112845 A1* | 5/2012 | Jung et al. | 331/117 R |

FOREIGN PATENT DOCUMENTS

| | | |
|---|---|---|
| DE | 198 41 972 A1 | 3/2000 |
| GB | 2 094 574 A | 9/1982 |
| JP | 3 270655 A | 12/1991 |
| JP | 10 189369 A | 7/1998 |

OTHER PUBLICATIONS

International Search Report for PCT/EP2010/003461—Case Z-846FMQ—dated Jan. 25, 2011.

* cited by examiner

*Primary Examiner* — Adolf Berhane
(74) *Attorney, Agent, or Firm* — John P. Colbert

(57) ABSTRACT

A circuit arrangement for the inductive transfer of energy is disclosed. The circuit arrangement includes an oscillator; a power supply for supplying the oscillator with energy and having a complex input resistance; and a device for detecting the inductive load of the oscillator and for modifying the complex input resistance of the power supply depending on the load of the oscillator.

6 Claims, 4 Drawing Sheets

CIRCUIT ARRANGEMENT AND METHOD FOR INDUCTIVE ENERGY TRANSFER

CROSS REFERENCE TO RELATED APPLICATIONS

This application is a continuation of International Application No. PCT/EP2010/003461, filed Jun. 9, 2010, the substance of which is incorporated by reference in its entirety herein.

FIELD OF THE INVENTION

The present disclosure relates to a circuit arrangement and a method for inductive energy transfer for small electrical devices, for example, an electric toothbrush or an electric shaving apparatus.

BACKGROUND OF THE INVENTION

Small electrical devices powered by rechargeable batteries are customarily charged at an external charging station. Known in the art are contactless charging stations which have a power supply and which inductively transfer energy from the charging station to the device. To this end, an alternating magnetic field is generated in the charging station by an oscillator which has a coil element and a capacitor element, wherein the coil element simultaneously forms the primary coil of an inductive transmitter and the secondary coil of the transmitter is arranged in the device being charged. For this reason, the charging station is normally designated as the primary side and the device being charged is designated as the secondary side. The oscillator is damped by the energy output via the magnetic field of the transmitter. As a result, the power supply must resupply electrical energy accordingly.

Modern charging stations normally have three operating states. The first state is the operating mode, in which the secondary side demands a constant supply of energy, for example, for operating the device or for charging a rechargeable battery installed in the device.

The second state is the simple standby mode, in which the device is not in the charging station, therefore there is no energy demand at all. The third state is what is known as the extended standby mode, in which the device is located in the charging station but requires energy only occasionally, for example, because the rechargeable battery is fully charged but must occasionally be recharged in order to compensate for self-discharge or the device's own consumption. In this last mentioned case the charging station should switch back and forth between the simple standby mode and the operating mode as needed. The respective operating state of the charging station (primary side) is thus determined by the energy requirements of the small electrical device (secondary side).

It is known to detect the energy requirements of the secondary side directly at the secondary side, transmit corresponding information to the primary and to accordingly adjust the oscillator (meaning, for example, to correspondingly adjust the base emitter voltage of a transistor operating in the oscillator). This solution is rather complex because it requires means for transmitting information from the secondary side to the primary side. As an alternative, the energy requirements of the secondary side might be determined by measuring the energy consumption of the oscillator (primary side) and regulating the oscillator accordingly. However, this variation is ill-suited for adjusting multiple operating states because the energy consumption of the charging station is influenced only minimally by the energy consumption of the device, due to the normally weak coupling between the primary and secondary side of the transmitter.

As such, there is a need to minimize the power consumption of the circuit arrangement in the standby mode for reasons of energy efficiency (see EU Directive 205/32), and therefore to specify a method for the inductive transfer of energy and a circuit arrangement which may be switched in a simple manner to an operating state with reduced power consumption depending on the energy requirements of the secondary side.

SUMMARY OF THE INVENTION

In one embodiment, a circuit arrangement for the inductive transfer of energy is provided. The circuit arrangement includes an oscillator; a power supply for supplying the oscillator with energy and having a complex input resistance; and a device for detecting the inductive load of the oscillator and for modifying the complex input resistance of the power supply depending on the load of the oscillator.

These and other features, aspects and advantages of specific embodiments will become evident to those skilled in the art from a reading of the present disclosure.

BRIEF DESCRIPTION OF THE DRAWINGS

The embodiments set forth in the drawings are illustrative in nature and not intended to limit the invention defined by the claims. The following detailed description of the illustrative embodiments can be understood when read in conjunction with the following drawings, where like structure is indicated with like reference numerals and in which:

DETAILED DESCRIPTION OF THE INVENTION

Figure 1:
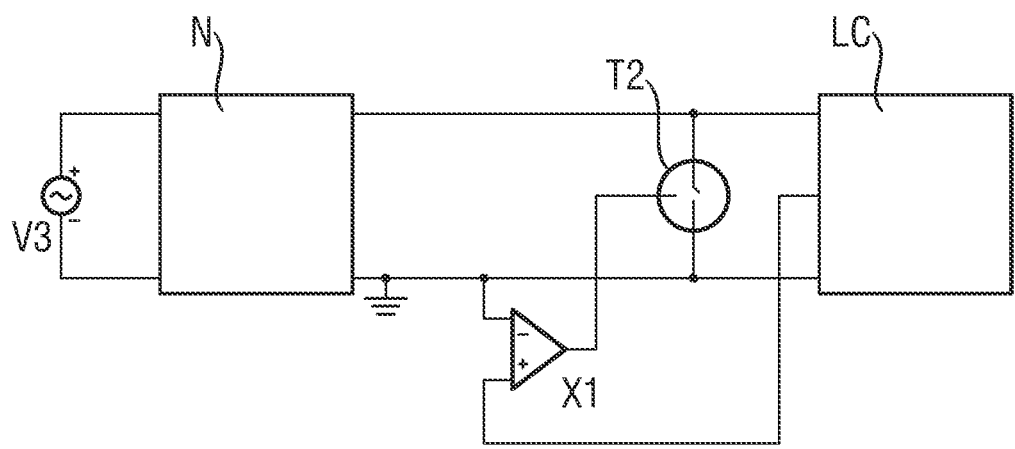
FIG. 1 is a block diagram of a circuit arrangement for the inductive transfer of energy according to embodiments shown and described herein.

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

According to the present disclosure, a circuit arrangement for the inductive transfer of energy is provided. In one embodiment, the circuit arrangement includes an oscillator and a power supply having a complex input resistance that supplies the oscillator with energy. The circuit arrangement may also include a device for detecting the inductive load of the oscillator and for modifying the complex input resistance of the power supply in accordance with the load of the oscillator.

In one embodiment, the power supply may have a capacitive series resistance, a rectifier and a load resistance, and a complex input resistance which is essentially determined by the load resistance and the capacitive series resistance. The capacitive series resistance and/or the load resistance is/are variable depending on the load of the oscillator, such that given a lower oscillator load it is possible to reduce the non-reactive power consumption of the circuit. (standby mode).

To modify the capacitive portion of the complex input resistance, in one embodiment at least one capacitor and a controllable switch are provided, the switching path of which is connected in such a way that the non-reactive resistance of the arrangement of at least one capacitor and the switch is switchable. A parallel circuit made up of a capacitor and an electronic switch may be arranged at the input of the power supply, in series with a further capacitor, or a series circuit made up of a capacitor and an electronic switch arranged parallel to another capacitor (capacitive series resistance). In the standby mode, the switch is opened so that the non-reactive resistance at the input of the power supply is comparatively high and the output voltage of the power supply is correspondingly reduced as compared with the operating-mode, in which the switch is closed. In the standby mode, the circuit arrangement therefore predominantly consumes reactive power.

To modify the ohmic portion of the complex input resistance, in a first variant of the circuit arrangement at least one ohmic resistor and one controllable switch are provided, the switching path of which switch is connected in such a way that the non-reactive resistance of the arrangement of at least one ohmic resistor and the switch is switchable. In one embodiment, a series circuit formed by an ohmic resistor and an electronic switch at the output of the power supply is arranged. In the standby mode, the switch is closed so that the output of the power supply is terminated by a comparatively low resistance and the output voltage of the power supply is correspondingly reduced as compared with the operating mode, in which the switch is opened. The non-reactive power consumption of the circuit arrangement is therefore is also reduced.

In a second embodiment of the circuit arrangement, the oscillator acts as a switchable load resistance. The oscillator has an active element, for example, a transistor. In one embodiment, the oscillator may be a Colpitts or Hartley oscillator in common-base configuration, wherein the emitter resistance of the transistor—and thereby also the load of the power supply—may be switched by the oscillator.

The circuit arrangement may be designed so that the oscillator oscillates, even in standby mode, although with reduced power consumption as compared to the operating mode. This is sufficient to reduce the power consumption of the circuit arrangement to the desired level. The device for detecting the inductive load of the oscillator due to the secondary side is also in operation in the standby mode so that any increased power demand occurring at the secondary side may be detected immediately and the power output of the oscillator can be promptly adjusted. Alternatively, in the standby mode the device for detecting the load of the oscillator and/or the oscillator may be time-controlled to switch on and off in order to further reduce the power consumption of the circuit arrangement.

The device for detecting the inductive load of the oscillator determines the load of the oscillator and therefore the power requirements of the secondary side based on an electrical variable occurring in the oscillator; the device compares the variable with a reference value and regulates the controllable switch so that the complex input resistance of the power supply may, if necessary, be modified in accordance with the load of the oscillator. The electrical variable is, for example, the amplitude of the collector voltage or of the base voltage of the transistor of the oscillator. In one embodiment, only the amplitude or a mean value of the amplitude of the negative semioscillation in the oscillator may be detected. Namely, the amplitude of the negative half-wave of the oscillator resonance varies particularly significantly in accordance with the load of the secondary side.

The present disclosure also includes a method for the inductive transfer of energy to a small electrical device by means of a circuit arrangement which includes an oscillator, a power supply having a complex input resistance that supplies the oscillator with energy, and a device for detecting the inductive load of the oscillator and for modifying the complex input resistance of the power supply according to the load of the oscillator, wherein given a lower load of the oscillator the non-reactive power consumption of the power supply is reduced by modifying the complex input resistance.

The non-reactive power consumption of the power supply is reduced in that the output of the power supply is terminated with a comparatively low resistance by means of a controllable switch, and/or in that the capacity of a capacitive series resistance of the power supply is reduced. The power requirements of the secondary side are determined from an electrical variable detected in the oscillator. The amplitude or a mean value of the amplitude of the negative semioscillation is preferably detected in the oscillator, compared to a reference value and, if necessary, the complex input resistance of the power supply is reduced.

The block diagram according to FIG. 1 shows a circuit arrangement with a power supply N and a self-oscillating oscillator LC which generates an alternating magnetic field. In one embodiment, the oscillator has a coil which serves to inductively transfer electrical energy from the oscillator LC (primary side) to a consumer (secondary side) not shown in the Figure, for example, a small electrical device which for this purpose contains a receiver coil that may be coupled to the coil of the oscillator. The oscillator draws electric energy from the mains V3 by way of power supply $N_1$ which has a complex input resistance. The circuit arrangement also has a controllable switch T2 and a device X1 for detecting the load of the oscillator LC, which controls the switch T2. Via the controllable switch T2 the complex input resistance of the power supply N may be switched over so that the circuit arrangement consumes less active power from the mains V3 in standby mode than in the operating mode. The controllable switch T2 may, for example, be realized via a relay or a transistor which may be electrically or optically controlled.

Figure 2:
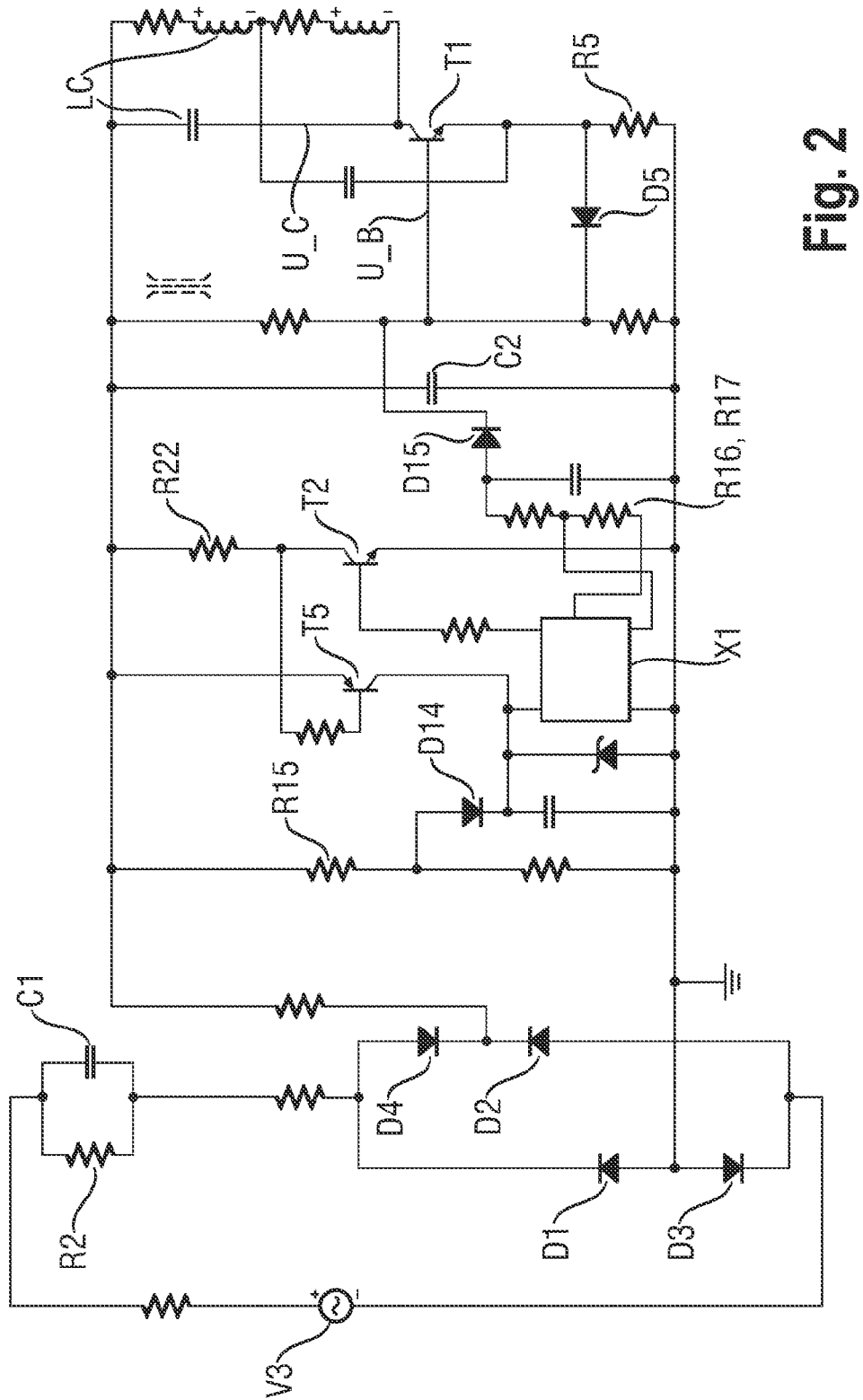
FIG. 2 shows a circuit arrangement with a Hartley oscillator according to embodiments shown and described herein.

In the circuit arrangement shown in FIG. 2, the power supply has a capacitive series resistance in the form of capacitor C1 and a rectifier bridge with diodes D1, D2, D3, D4, which, combined with a capacitor C2, generate from the alternating mains voltage a smoothed direct voltage with which the oscillator LC is operated. Connected in parallel to the capacitor C1 is a resistor R2 which ensures that the capacitor C1 is discharged once the power supply N has been separated from the mains V3. The resistor R2 has a relatively high impedance as compared to the non-reactive resistance of capacitor C1, as a result of which the complex input resistance of the power supply N is determined essentially by the capacitive resistance of the capacitor C1.

In the event the circuit arrangement is to be switched into standby mode, the capacitive series resistance is then connected to ground via the rectifier bridge and a transistor T2 and a resistor R22. In this way the power consumption of the circuit arrangement from the mains is shifted from the non-reactive power range in the direction of the reactive power range, and a reduction of the non-reactive power consumption from the mains is thus achieved. If the transistor T2 is fully conductive, the current is then restricted essentially by the resistor R22 and the capacitor C1. If the resistance value of R22 is zero, the oscillator is then completely disconnected from the energy supply. The mains then experiences a purely capacitive reactive load. However, the resistance R22 may be dimensioned so that, when transistor T2 is conductive, a voltage is set at capacitor C2 that is still sufficient to operate the oscillator, wherein the oscillator only oscillates at a reduced amplitude.

In one embodiment, the circuit arrangement includes as oscillator LC a Hartley oscillator in common-base configuration which has a transistor T1 as an active element. To detect the load of the oscillator due to the secondary side, a device X1 is provided (a microcontroller, for example) as well as a diode D15 and a voltage divider formed by the resistors R16 and R17. The negative half-wave of the base voltage U_B of the transistor T1 is applied at one end of the voltage divider R16, R17. The voltage U_B is introduced via the diode D15 and represents the load of the oscillator LC. A positive reference voltage generated by the microcontroller X1 is applied at the other end of the voltage divider R16, R17. The voltage at the center tap of the voltage divider R16, R17 is fed to the microcontroller X1. The negative base voltage U_B of the transistor T1 is transformed into the positive voltage range by means of the voltage divider R16, R17 so that the voltage may be compared with a reference value by the microcontroller X1. The microcontroller X1 then controls the transistor T2 in accordance with the results of the comparison. Instead of the negative half-wave of the base voltage, it is also possible to evaluate the negative half wave of the collector voltage U_C.

Via a voltage divider with a resistor R15, a diode D14 and a transistor T5, the microcontroller X1 is still supplied with energy from the power supply even when the transistor T2 is conductive and the circuit arrangement is in the standby mode. As soon as it detects an increase in energy demand at the secondary side, it again disables the transistor T2. The microcontroller X1 may also be provided with a control program which, for example, switches the transistor T2 on and off in accordance with a predefined timing sequence.

Figure 3:
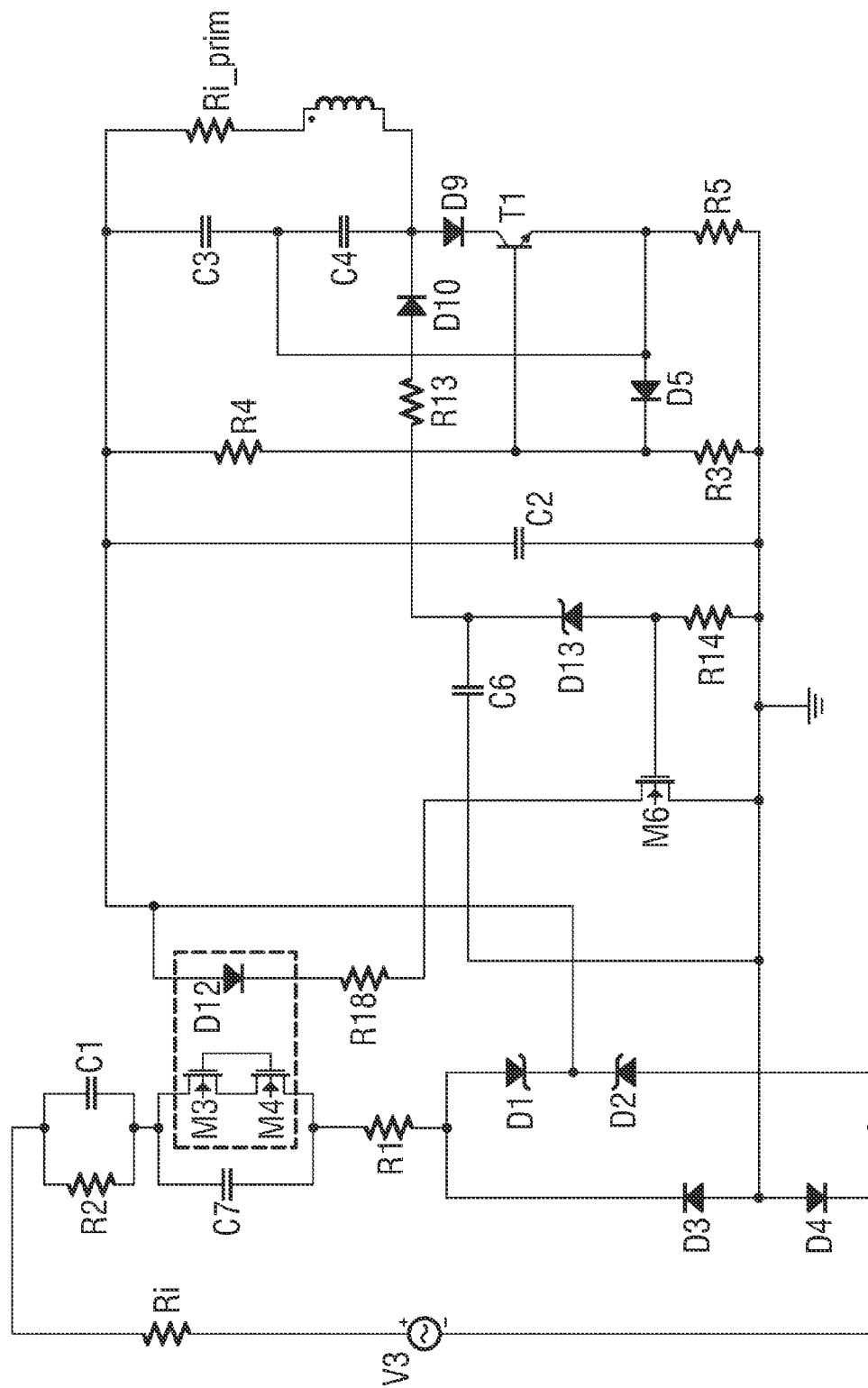
FIG. 3 shows a first circuit arrangement with a Colpitts oscillator according to embodiments shown and described herein.
Figure 4:
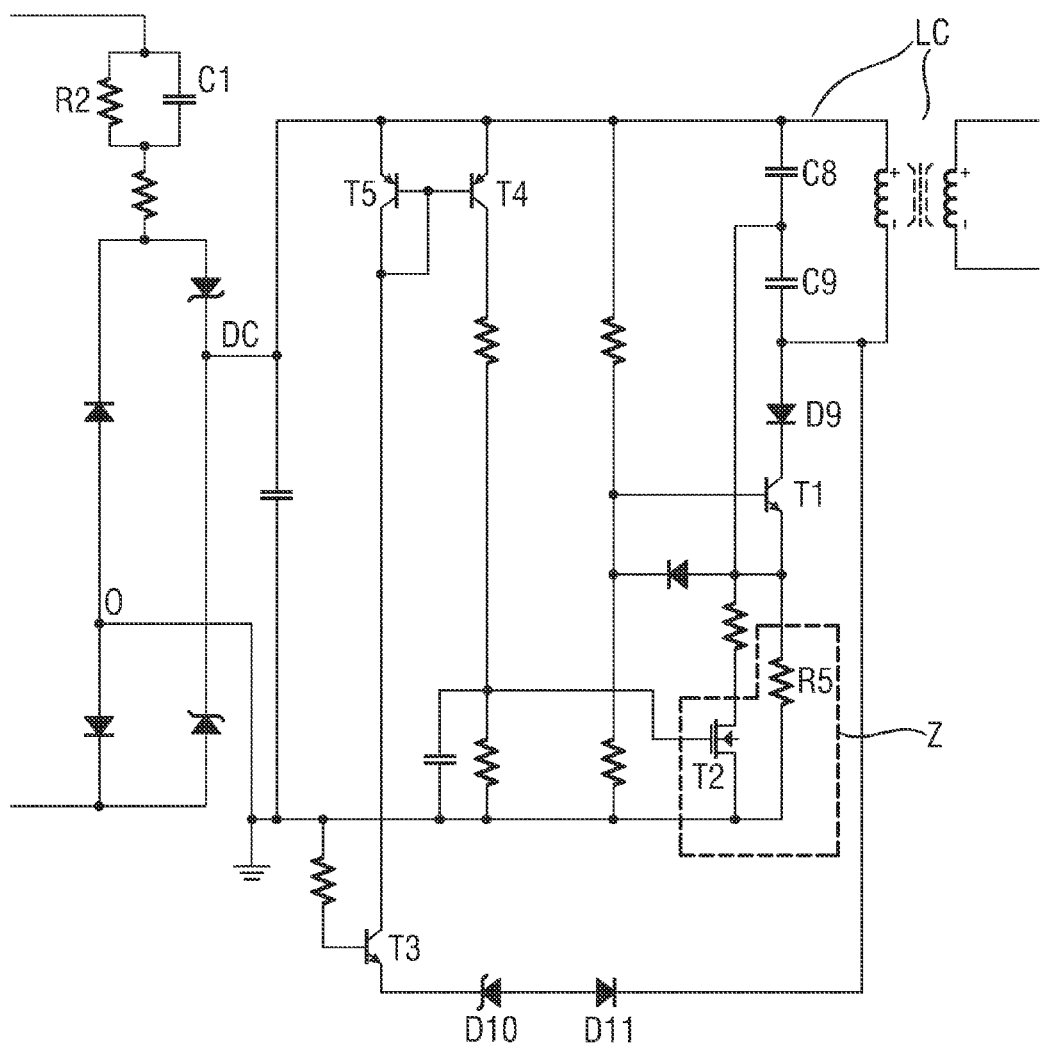
FIG. 4 shows a second circuit arrangement with a Colpitts oscillator according to embodiments shown and described herein.

In another embodiment of the circuit arrangement described above, a Colpitts oscillator is used instead of a Hartley oscillator and/or a discrete circuit is used in place of a microcontroller to detect the load of the oscillator and for modifying the complex input resistance of the power supply, for example, as shown in FIG. 3 or 4.

In the circuit arrangement shown in FIG. 3, the power supply contains a complex input resistance, the capacitive portion of which may be modified in accordance with the load of the oscillator. The power supply contains a capacitive series resistance and a rectifier bridge with diodes D1, D2, D3, D4 which, combined with a capacitor C2, generate from the alternating mains voltage a smoothed direct voltage with which the oscillator is operated. The capacitive series resistance has a capacitor C7 and a capacitor C1 to which a resistor R2 is connected in parallel, which resistor ensures that the capacitor C1 is discharged once the power supply N has been separated from the mains V3. An electronic switch is connected in parallel to the capacitor C7 and includes two serially connected transistors M3, M4 and forms part of the optocoupler. The parallel circuit made up of the capacitor C1 and the resistor R2 is connected in series with the parallel circuit made up of the capacitor C7 and the transistors M3, M4. The resistor R2 is of relatively high impedance as compared to the non-reactive resistance of the capacitor C1. The complex input resistance of the power supply N is essentially determined by the capacitive resistance of the capacitor C1 when the electronic switch is closed or, respectively, by the capacitive resistance of the two serially connected capacitors C1 and C7 when the electronic switch is opened.

If the circuit arrangement is to be switched into standby mode, the electronic switch is then opened, meaning that the diode D12 of the optocoupler is switched off. In this way the non-reactive power consumption of the circuit arrangement from the mains is reduced since the non-reactive resistance of both serially connected capacitors C1, C7 is substantially greater than the non-reactive resistance of the capacitor C1. At this point the power supply absorbs almost solely reactive power. In one embodiment, the capacitors C1, C7 are dimensioned so that, in the standby mode, a voltage is applied at the capacitor C2 which is still sufficient for operating the oscillator, wherein this oscillates only with reduced amplitude.

In one embodiment, the oscillator contained in the circuit arrangement is a Colpitts oscillator in common-base configuration which has a transistor T1 as an active element. In order to identify the load of the oscillator due to the secondary side, a circuit is provided that has two diodes D10, D13, two resistors R13, R14, a capacitor C6 and a switching transistor M6. The cathode of the diode D10 is connected to the collector of the transistor T1. The negative half-wave of the collector voltage U_C of the transistor T1 occurs at the anode of the diode D10. This voltage is representative of the load of the oscillator LC. Instead of the negative half-wave of the collector voltage, it is also possible to evaluate the negative half-wave of the base voltage U_B. The anode of the diode D10 is connected via the resistor R13 to the one end of the capacitor C6 and the cathode of the diode D13. The other end of the capacitor C6 is connected to ground. The anode of the diode D13 is connected to the control terminal of the switching transistor M6 and via the resistor R14 to ground. The switching path of the switching transistor M6 is connected in series to the diode D12 of the optocoupler and to at least one current-limiting resistor R18.

The switching transistor M6 is disabled only when a sufficiently high negative voltage is applied at the control terminal of the switch. When the load of the oscillator is low, a sufficiently high negative voltage is then fed via the diodes D10 and D13 and the resistor R13 to the control terminal of the switching transistor M6, with the result that the diode D12 of the optocoupler is switched off, the transistors M3, M4 of the electronic switch are disabled and the complex input resistance takes on a high value.

Instead of the optocoupler and capacitor 7, another embodiment of the circuit arrangement described above uses a series circuit made up of a transistor T2 and a resistor R22 parallel to capacitor C2 for modifying the complex input resistance of the power supply, as is shown in FIG. 2, or the circuit arrangement uses a switchable emitter resistance in the oscillator, as is shown in FIG. 4.

FIG. 4 shows a further circuit arrangement having a Colpitts oscillator in common-base configuration. This circuit arrangement is designed to detect the negative voltage amplitude of the oscillation in the oscillator LC. If the negative voltage amplitude exceeds a predetermined value in terms of its magnitude—this in the case of an unloaded oscillator LC—a path with a Zener diode D10 and a diode D11 becomes conductive and a transistor T3 becomes conductive. The transistors T4 and T5 may also become conductive if their base emitter voltages exceed a predetermined value in terms of magnitude. The two transistors T4 and T5 control a field effect transistor T2, the switching path of which is connected parallel to an emitter resistor R5. When T2 is conductive, the non-reactive resistance Z at the emitter of the transistor T1 is comparatively low, such that the energy supply in the oscillator LC is maximum. However, the capacitive series resistance C1 of the power supply is not designed for such a high output, such that the output voltage of the power supply—and therefore also the non-reactive power consumption of the circuit arrangement—is reduced because now the output of the power supply is terminated by a resistance that is too small.

If the negative voltage amplitude decreases in terms of magnitude as compared to a reference value determined by the Zener diode D10, this is an indication of a stronger damping, thus of a greater energy requirements at the secondary side. The transistor T2 is disabled and the non-reactive resistance Z at the emitter is comparatively high. This is the operating state of the circuit arrangement, in which the power consumption of the oscillator is adapted to the capacitive series resistance C1 of the power supply and maximum power is transferred to the secondary side.

A diode D9 at the collector of the transistor T1 prevents any possible return current flow in the blocking direction of the transistor T1, which would be borne by the diode paths D10, D11; thus, it supports the ability of the negative voltage amplitude in the oscillator LC to be evaluated.

The disclosure also relates to a method for the inductive transfer of energy from a circuit arrangement (primary side) to a small electrical device (secondary side), wherein the circuit arrangement has an oscillator for generating and emitting an alternating magnetic field, and wherein the power requirements of the secondary side may be determined based on an electrical variable which is detectable in the oscillator. The circuit arrangement also has a power supply with a complex input resistance which supplies the oscillator with energy, and a device for detecting the inductive load of the oscillator and for modifying the complex input resistance of the power supply in accordance with the load of the oscillator, wherein given a lower load of the oscillator the non-reactive power consumption of the power supply is reduced by modifying the complex input resistance. The non-reactive power consumption of the power supply is reduced in that the output of the power supply is bridged with a comparatively low resistance by means of an electronic switch, and/or in that the capacity of a capacitive series resistance is reduced. The power requirements of the secondary side are preferably determined based on the amplitude or the mean value of the negative semioscillation at an active element (transistor) of the oscillator.

All the embodiments of the circuit arrangements described above are particularly suited for use in inductive charging stations for small rechargeable battery-operated electrical devices such as electric toothbrushes, shaving apparatuses or communication devices such as, for example, portable telephones.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A circuit arrangement for the inductive transfer of energy comprising:
    an oscillator;
    a power supply for supplying the oscillator with energy and having a complex input resistance; and
    a device for detecting the inductive load of the oscillator and for modifying the complex input resistance of the power supply depending on the load of the oscillator;
    wherein the power supply has a capacitive series resistance, a rectifier and a load resistance; and wherein the capacitive series resistance may be modified depending on the load of the oscillator, such that the non-reactive power consumption of the circuit arrangement is reduced when the load of the oscillator is lower.

2. The circuit arrangement according to claim 1, wherein the load resistance may be modified depending on the load of the oscillator, such that the non-reactive power consumption of the circuit arrangement is reduced when the load of the oscillator is lower.

3. The circuit arrangement according to claim 2, wherein the load resistance is formed by at least one resistor and the switching path of a controllable switch, such that an ohmic resistance of the arrangement formed by the at least one resistor and the switch is switchable.

4. The circuit arrangement according to claim 2, wherein the load resistance is formed by the oscillator.

5. The circuit according to claim 4, wherein the oscillator is a Hartley or Colpitts oscillator with an active element.

6. The circuit arrangement according to claim 1, wherein the capacitive series resistance is formed by at least one capacitor and by the switching path of at least one controllable switch, such that the non-reactive resistance of the arrangement formed by the capacitor and the switch is switchable.

* * * * *